United States Patent [19]

Graham

[11] 4,272,952
[45] Jun. 16, 1981

[54] PLASTIC CHAIN AND TUBULAR LINK PIN

[75] Inventor: Richard B. Graham, Columbus, Ohio

[73] Assignee: Dresser Industries, Inc., Dallas, Tex.

[21] Appl. No.: 37,185

[22] Filed: May 8, 1979

[51] Int. Cl.³ .................................... F16G 13/06
[52] U.S. Cl. .................................. 59/84; 474/207;
474/223; 474/224; 474/230
[58] Field of Search .................. 59/8, 10, 12, 35, 78,
59/84, 85, 90; 198/853; 74/245 C, 245 R, 245
LP, 245 P, 248, 249, 250 R, 250 C, 251 R, 251
C, 252, 254, 255 R, 258

[56] References Cited

U.S. PATENT DOCUMENTS

| | | |
|---|---|---|
| 304,625 | 9/1884 | Doubleday ............... 74/251 R |
| 428,863 | 5/1890 | Sheldrick ................. 74/252 |
| 437,978 | 10/1890 | Case ......................... 74/254 |
| 508,258 | 11/1893 | Taplin ....................... 74/251 R |
| 1,293,835 | 2/1919 | McGowan ................ 74/251 R |
| 1,469,001 | 9/1923 | Gentry ..................... 74/251 R |
| 2,661,228 | 12/1953 | Wilson ..................... 74/254 |

FOREIGN PATENT DOCUMENTS 238454 8/1925 United Kingdom ............... 74/250 R
907865 10/1962 United Kingdom ............... 74/249

Primary Examiner—Nicholas P. Godici
Assistant Examiner—Gene P. Crosby
Attorney, Agent, or Firm—Paul E. Krieger; Fred A. Winans

[57] ABSTRACT

A plastic chain has a link which includes two sections formed of molded thermoplastic material. One end of each link section includes a first opening and is shaped so that when the link sections are joined, the ends will be spaced apart and the first openings aligned. The other end of each section includes a second opening. First and second mating means cooperate to join the other end to form a link. The ends with the first openings are spaced apart a sufficient distance to accommodate at least a portion of the joined other ends of an adjacent similarly-shaped link so that the first openings can be aligned with the second openings in the adjacent link to receive a link pin which is in the form of a hollow tube with a manually releasable resilient latch.

18 Claims, 6 Drawing Figures

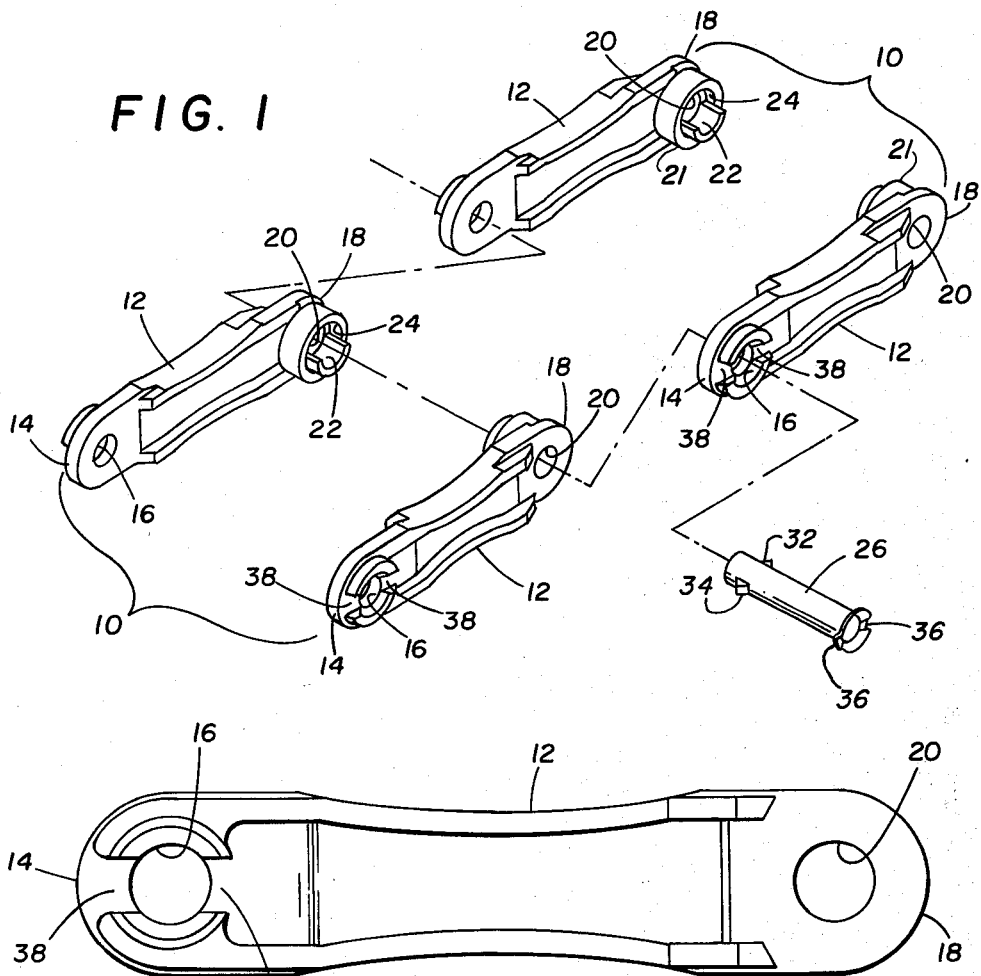
FIG. 1
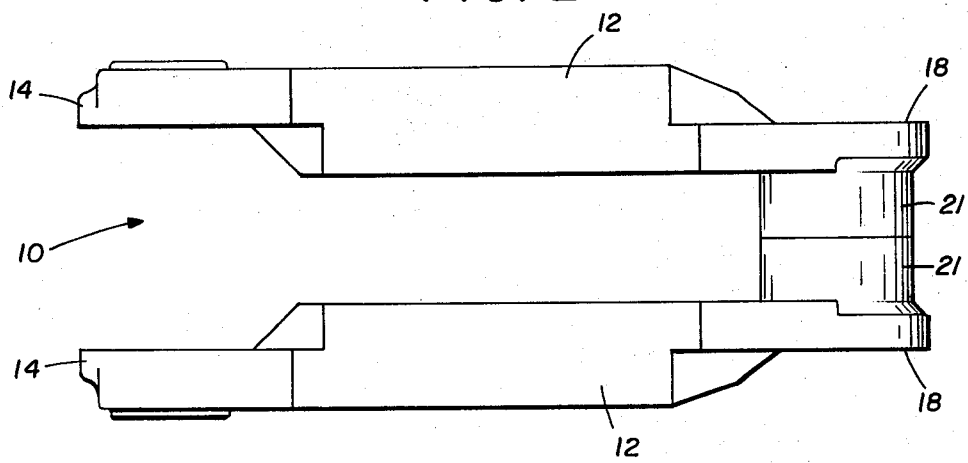
FIG. 2
FIG. 3

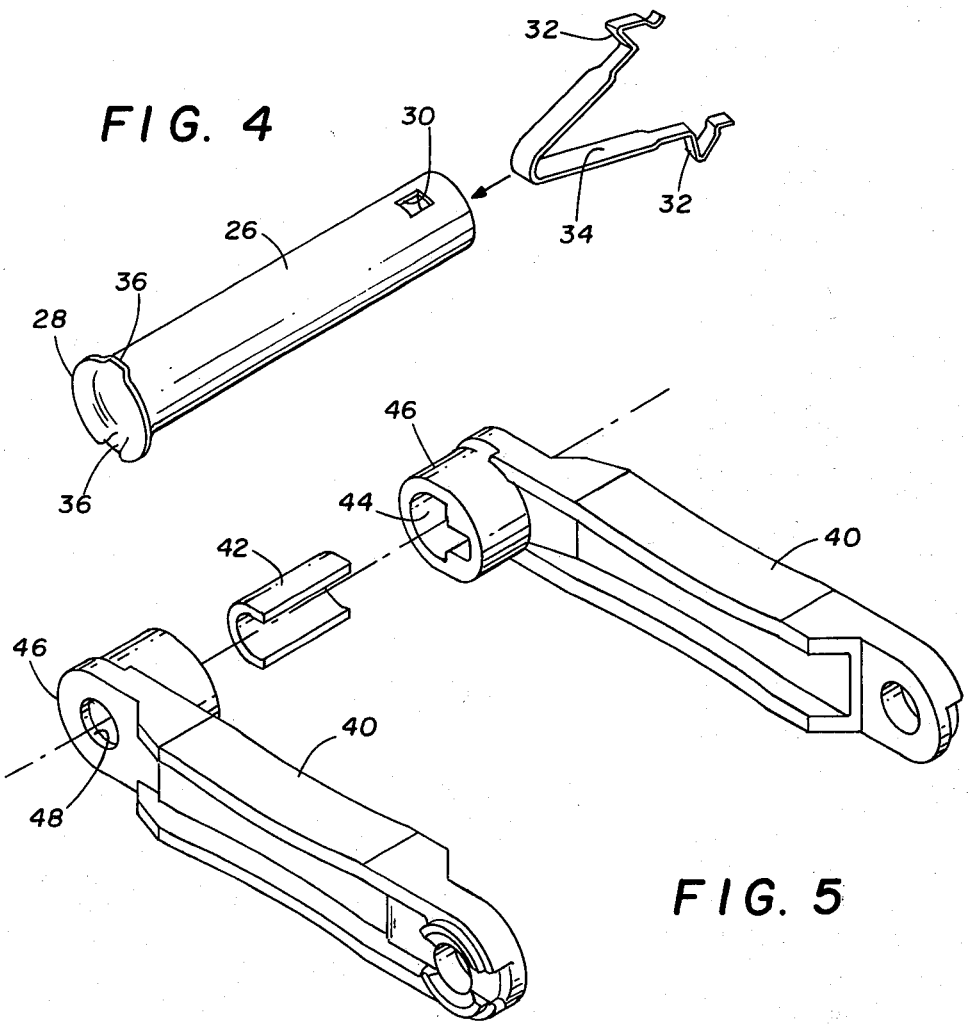
FIG. 4
FIG. 5
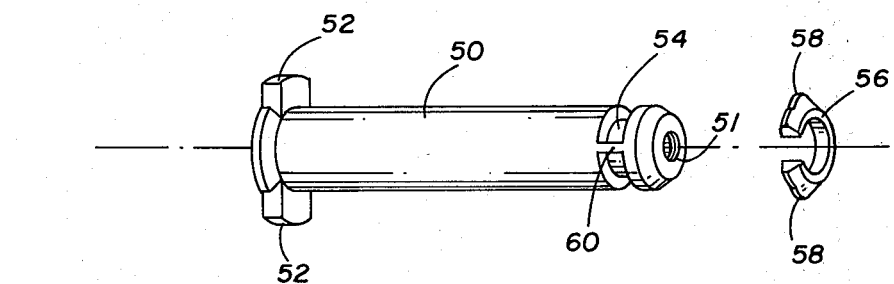
FIG. 6

PLASTIC CHAIN AND TUBULAR LINK PIN

BACKGROUND OF THE INVENTION

This invention relates to drag chains used for collecting sludge in sewage treatment plants and, more particularly, to such chains which are formed of thermoplastic material.

Traditionally, the sanitary chain used in sewage collection tanks has been formed of malleable cast iron. In recent years, a chain formed of thermoplastic material has been developed to replace the heavy, bulky, cast iron chain. The plastic chain has the advantages of lower weight for reduced chain pull and wear and lower sprocket wear, of greater corrosion resistance, and of lower installation cost and less power consumption of such systems.

The plastic chain which is now in use is formed as a unitary, one-piece link which has cross sections difficult to injection mold and provide sufficient strength because of design limitations inherent in one-piece molded articles. In addition, the narrow sidebar edges of such a unitary molded link do not provide other than a small area for contact with matching rims normally provided intended to help support the chain on the sprockets, a feature described in detail in U.S. Pat. No. 2,869,380. The connecting pins of the chain links of this prior art device are also formed of glass reinforced thermoplastic material and require an assembly tool for installation and removal because the pin is press-fitted in place. With press-fitting, two portions of the pin have to be larger than their cooperating openings and the opening on one side of the joined links must be larger than the other opening so the pin can be inserted without impairing the quality of the fit, thus the pin can only be installed and removed from one side of the link. This causes problems where access is restricted. An entirely plastic pin also adds significantly to longitudinal deformation of the chain over long-term use due to inherent creep of thermoplastic materials. If abrasive reinforcing fibers are added to the molding compound to increase resistance to creep deformation, the pin is not a good bearing material for a part whose main requirement is to serve as a pivot in a rotational sliding bearing arrangement.

SUMMARY OF THE INVENTION

In accordance with the invention, a chain formed of a thermoplastic material has been developed which is stronger than heretofore known plastic chains even though less material is used. In addition, creep in the pin is eliminated because instead of using a link pin formed of thermoplastic material, a hollow tubular metallic or metal reinforced plastic pin has been designed which maximizes strength with minimum material cost. The design allows for simple manual installation from either side of the chain since interference type press-fitting is not utilized.

The chain is formed of connected links which are themselves formed of two identically-shaped link sections. One end of each link section has an opening which is shaped so that when the two link sections are joined at the other end those ends will be spaced apart from each other to form a gap with the openings aligned. The other end of each link section has an opening with a mating surface located around the opening. Cooperating joining means can be formed on each section or be in the form of a separate piece for rigidly joining the sections together to form a unitary link.

The spaced-apart ends form a gap between them sufficient to accommodate at least a portion of the joined other ends of an adjacent similarly-shaped link so that all the openings are aligned to receive a pin for joining the two links together.

Injection molding is the accepted way to form these links. By forming the link sections identical to each other, production and inventory costs are significantly reduced since only one style mold cavity (which is a fairly expensive item) needs to be fabricated, which also guarantees a uniform product and identification of slightly different but identical appearing parts is not required.

The invention also is directed to a tubular link pin for joining the links together. The link pin can be in the form of a hollow metal tube or a tube formed of thermoplastic material with a metallic reinforcing tube of a uniform diameter along its length adapted to fit in aligned openings of adjacent links. One end of the tube is provided with a head larger than the link openings and the other end includes a manually releasable latch means for holding the tube in place.

The latch means can be in the form of a resilient metal clip or a split metal or plastic ring with portions which project out of openings in the tube into the path of the link for locking the link pin in place. The projecting portions are urged outwardly by means of the spring resilience of the clip or ring and are automatically depressed as the pin enters the link openings at assembly and snap into position as the pin seats. The design also allows easy manual removal by pressing the clip or ring and pulling on the pin.

The head of the link pin can be flared and include T-shaped channels which fit in cooperating slots located adjacent to the outermost link openings for preventing the pin from rotating in the first opening which forces relative rotation between the pin and the second opening of the adjacent link as the chain moves.

Thus, a plastic chain and tubular link pin have been developed which cost less to produce without sacrificing performance. Installation and replacement are quick and simple tasks which add to the cost benefits of the subject chain.

BRIEF DESCRIPTION OF THE DRAWINGS

A greater understanding of the invention may be obtained when a detailed description of preferred embodiments set forth below is considered in conjunction with the accompanying drawings in which:

FIG. 1 is an exploded perspective view of a plastic chain link formed of two sections in accordance with the invention;

FIG. 2 is a side plan view of the link of FIG. 1;

FIG. 3 is a top plan view of the two link sections of FIG. 1 when joined together to form a single link;

FIG. 4 is an exploded perspective view of a link pin and associated resilient spring latch;

FIG. 5 is an exploded perspective view of a link showing a second embodiment of the invention where two link sections are rigidly joined by a separate connecting piece; and FIG. 6 is an exploded perspective view of a second embodiment of the link pin.

DETAILED DESCRIPTION OF A PREFERRED EMBODIMENT

Referring to FIG. 1, an embodiment of the plastic chain which is the subject matter of this invention is shown where a chain link is generally designated by reference numeral 10 and is formed of two link sections 12, which are identical in shape. The link sections are formed of a thermoplastic material by an injection or similar molding process.

Link sections 12 are formed with one end 14 which is shaped so that when the link sections 12 are joined together at the other end the ends 14 will be spaced apart and corresponding openings 16 aligned with each other. The other end 18 of each link section 12 includes an opening 20, the two sections 12 being joined by a mating configuration comprising a collar 21 formed around at least a portion of the opening 20 to form the link 10 as shown in FIG. 3 and provide the proper spacing between the links at one end.

In the embodiment of the invention shown in FIG. 1, the collar is formed integral with the link sections 12 and provides an indexing structure in the form of an integral semi-circular projection 22 and cooperating groove or recess 24 for receiving the projection 22 on the other link section 12. As can be seen from FIG. 1, the projections 22 and grooves 24 of facing link sections 12 cooperate with each other and mate so that the link sections 12 can rigidly be joined to form the unitary single chain link. In order to form a chain, a similarly-shaped link 10 can have its end 14 overlap the end 18 of the link 10 with all of the openings 16 and 20 aligned. The opening 20 is slightly larger than the opening 16 to provide clearance for the pin to rotate in opening 20. The two links 10 can then be coupled together by a link pin 26, which can be of the type described in detail below.

One embodiment of the link pin 26 is shown in FIG. 4 where the pin 26 is in the shape of a hollow tube formed of stainless steel. One end of the tube is flared as designated by reference numeral 28 for providing a head larger than the openings 16 and 20. The other end of the tube 26 has a pair of diametrically opposed openings 30 through each of which a shoulder 32 formed on a resilient spring latch 34 projects for locking the pin 26 in place. The portion of the latch 34 projecting upwardly away from the shoulder is sloped relative to the outer surface of the pin 26 so that when the pin is pushed into the openings 16 and 20, the shoulders 32 will engage the openings 30 and be compressed into the tube, allowing the pin easily to be pushed into place. The spring-like resilience of the latch 34 will urge the shoulders 32 outwardly to lock the pin 26 in place. In order to remove the link pin 26, the shoulders 32 can manually be pushed into the openings 30 and the pin pulled out for easy removal.

The flared portion 28 of the pin 26 includes two radially extending tab sections 36 which can engage a pair of slots 38, shown best in FIG. 2, located around the outer periphery of the openings 16 for preventing the link pin 26 from rotating during movement of the chain. On the other side of the link 12, the shoulders 32 also engage the slots of the facing link and prevents the pin from coming out of the link.

As shown best in FIGS. 1 and 2, each link section 12 has an I-beam shaped cross-section which provides optimum stress transfer during operation and maximizes the strength of each chain link 10 for the amount of material used. In addition, the cross section provides maximum contact areas with matching rims on sprockets over which the chain passes, thus extending both chain and sprocket lives (see description in U.S. Pat. No. 2,869,380). Normally an injection molding process would prohibit using such an I-beam cross-section configuration where an entire link is formed in a single mold since a link with such a shape could not be practicably withdrawn from the mold cavities. However, since each chain link 10 is formed of two sections 12, the I-beam cross-section configuration can be used since formation of a mold for half a link having that design is relatively simple.

Since identically-shaped link sections 12 are utilized, the openings 16 will be of the same diameter which would preclude the use of a press-fitted plastic link pin from being used to join the adjacent links 10 together because press-fitting normally requires openings 16 of different diameters. The openings 20 are also the same diameter, but larger than the openings 16 to provide clearance for pin rotation. The tubular metallic link pin 26 offers significant advantages over the press-fitted plastic pin in the prior art by providing maximum strength with minimum creep deformation over time and obviating the need for an installing tool that press-fitted plastic pins require.

The link sections 12 can be formed of a suitable thermoplastic material such as an acetal resin with or without strengthening fibers, with the link pin 26 being formed of heat treated stainless steel or other metal. These materials provide a chain which is relatively light in weight without sacrificing strength and which also is corrosion resistant and provides good bearing surfaces in water. In this way, a superior link chain configuration can be manufactured at a minimum cost which provides the extra benefits of easier handling, faster and less costly installation, a lower power requirement for moving the lighter chain and less maintenance. For a more rigid structure, the mated ends 18 of the joined link sections 12 can be fused together by ultrasonic welding or the like.

In a second embodiment of the link sections, as shown in FIG. 5, a pair of identical link sections 40 are shown which are similar in design to those described above, but are joined by means of a separate mating piece 42 which has a semi-cylindrical shape adapted to fit in cooperating grooves or recesses 44 located on the interior portion of the ends 46 of both link sections 40 and surrounding a portion of openings 48 at that end. This permits use of link plastics with high creep resistance but poor bearing qualities, the desired bearing qualities being provided by a different material of the mating piece 42. Adjacent chain links 10 formed of link sections 40 can be joined by a link pin (not shown) similar to that described above.

However, other shapes and configurations of link pins can be utilized in accordance with the invention such as, for example, a plastic pin 50 with an inner reinforcing steel tube 51 as shown in FIG. 6, with a T-shape head 52 at one end and a split ring locking mechanism at the other end. The locking mechanism includes a groove 54 formed in the outer surface of the tube 50 which accommodates a resilient split ring 56 with sloping retaining lobes 58, which operates in a manner similar to that of the resilient latch described above, the T-shaped heads 52 and lobes 58 engaging the slots 38 for preventing pin rotation. The groove 54 further includes a stop 60 for preventing the split ring 56 from rotating in the groove 54.

Thus, in accordance with the invention, a lightweight and relatively inexpensive plastic chain for sludge collector tanks has been developed which can be formed of injection molded link sections utilizing a relatively strong cross-sectional configuration which normally would not lend itself to an injection molding process. In addition, the design permits use of special appropriate materials for specific applications such as use in acidic or other media detrimental to the materials normally used. The chain link sections can be joined by means of a pin of a unique design which can be manually inserted and removed without the need for assembling tools which require additional time and expense.

It should also be understood that those with ordinary skill in the art will be able to make improvements and modifications to the invention and that all such improvements and modifications are contemplated as falling within the scope of the appended claims.

The embodiments of the invention in which an exclusive property or privilege is claimed are defined as follows:

1. Plastic chain link comprising a pair of separate facing link sections formed of molded thermoplastic material, each link section including in one end a first opening and in the opposite end a second opening bounded by mating means extending outwardly on the side of each link section toward like mating means on the other link section for abutting engagement thereof to provide a predetermined space between the links at said one end and indexing means cooperating with the mating means for rigidly joining the separate link sections together at said opposite end and aligning the first openings of each section and the second openings of each section respectively to form a unitary link, said predetermined distance sufficient to accommodate at least a portion of the like joined opposite ends of an adjacent similarly-shaped link so that the first aligned openings of each link can be aligned with the second aligned openings in the adjacent link to receive pin means for coupling the two links together.

2. The link of claim 1, where the link sections are identical in shape.

3. The link of claim 2, wherein the indexing means includes a semi-circular projection extending from the mating means and a semi-circular recess formed in a different part of the mating means, the projection and recess being sized and located so that the projection is tightly received in the recess of the other section for indexed joining the facing sections with said mating means abutting one another to provide the spaced relationship between facing sections of said one end.

4. The link of claim 1, wherein the mating means includes a collar which surrounds at least a portion of the second opening.

5. The link of claim 1, wherein each link section has an I-beam cross-section along a substantial portion of its length.

6. The link of claim 1, wherein the link sections are formed of injection molded thermoplastic material.

7. The link of claim 1, wherein the indexing means includes a recess between said extending mating means and said second opening for each link and a separate outwardly extending member shaped to fit in the recess of the facing section for coupling the sections together in a predetermined alignment.

8. The link of claim 1 further including a second adjacent link arranged end-to-end with the first link, the corresponding aligned second openings of the second link being aligned with the first opening of the first link, and pin means inserted through the aligned openings, the pin means defining a tubular shape having a head at one end and resilient latch means extending radially at the other end for releasably retaining the pin means in the openings to join said first and second links.

9. The link of claim 8, wherein the head includes at least one radially extending projection and the latch means includes radially retractable extensions and wherein the outermost surface of each link section includes a cooperating slot adjacent said first opening, said slot on one section receiving the projection and the slot on the other section receiving the retractable latch means for preventing rotation of the pin means relative to the first link section.

10. The link of claim 9, wherein the releasable latch means includes a spring clip formed of resilient metal located inside the pin means with at least one portion projecting outwardly through an opening in the pin means, said latter portion engaging said slot.

11. The link of claim 8, wherein the pin means is formed of stainless steel.

12. The link of claim 8 wherein the pin means is formed of a plastic material and includes an inner metallic reinforcing member.

13. The link of claim 12, wherein the head includes at least one radially extending projection and the outermost surface of each link section includes a cooperating slot for receiving the projection.

14. The link of claim 13, wherein the resilient latch means includes an groove around the outer surface of the pin on the end opposite the head and a resilient split ring in the groove.

15. A link pin for a plastic link chain, comprising a tube of uniform diameter along its length adapted to fit in aligned connecting openings of adjacent links said pin having a head at one end larger than said openings, latch means associated with the other end of the hollow tube including a radially extending and retractable lock portion which is resiliently urged outwardly from the tube a distance greater than the link openings to engage an outer face of the link, the lock portion being moved inwardly an amount sufficient for the pin to pass through the link openings during manual insertion or retraction of said pin.

16. The link pin of claim 15, comprising a hollow tube and wherein the enlarged head includes a flared end.

17. The link pin of claim 15, wherein the head includes at least one radial projection from the head cooperating with said link for preventing rotation of the pin relative to the link section.

18. The link pin of claim 15, wherein the tube is a hollow tube and includes two diametrically opposite openings at the end opposite said head and the latch means includes a spring clip formed of a single strip of resilient metal with portions resiliently projecting outwardly through the opposite openings, said portions engaging the outermost surface of cooperating link sections opposite said head.

* * * * *